US012717134B2

(12) United States Patent
Ivarsson

(10) Patent No.: US 12,717,134 B2
(45) Date of Patent: Aug. 25, 2026

(54) EYE TRACKING SYSTEM AND A CORRESPONDING METHOD

(71) Applicant: TOBII AB, Danderyd (SE)

(72) Inventor: Magnus Ivarsson, Danderyd (SE)

(73) Assignee: TOBII AB, Danderyd (SE)

( * ) Notice: Subject to any disclaimer, the term of this patent is extended or adjusted under 35 U.S.C. 154(b) by 478 days.

(21) Appl. No.: 18/533,717

(22) Filed: Dec. 8, 2023

(65) Prior Publication Data

US 2024/0192489 A1 Jun. 13, 2024

(30) Foreign Application Priority Data

Dec. 8, 2022 (SE) .................................. 2230401-8

(51) Int. Cl.
*G06T 7/80* (2017.01)
*G02B 27/00* (2006.01)

(52) U.S. Cl.
CPC ........... *G02B 27/0093* (2013.01); *G06T 7/80* (2017.01)

(58) Field of Classification Search
None
See application file for complete search history.

(56) References Cited

U.S. PATENT DOCUMENTS

2012/0050493 A1* 3/2012 Ernst .................... G02B 27/017 348/47
2016/0225191 A1 8/2016 Mullins
2017/0340205 A1* 11/2017 Liu ........................ A61B 3/113
2019/0121427 A1 4/2019 Qin et al.
2020/0174560 A1 6/2020 Park et al.
2020/0209628 A1 7/2020 Sztuk et al.
2020/0257357 A1* 8/2020 Ren ......................... G06T 7/246
2023/0363852 A1* 11/2023 Kitahara ................ A61B 90/50

FOREIGN PATENT DOCUMENTS

EP 3547216 B1 2/2019
EP 3 547 216 A1 10/2019
WO 2015154882 A1 10/2015
WO 2016075532 A1 5/2016
WO WO-2016097919 A1 * 6/2016 ............ A61B 3/113
WO 2020110121 A1 6/2020
WO 2022084803 A1 4/2022
WO WO-2024123766 A1 * 6/2024 ............ G06V 10/60

OTHER PUBLICATIONS

Villanueva, A.—"A Novel Gaze Estimation System With One Calibration Point"—IEEE 2008—pp. 1123-1138 (Year: 2008).*
(Continued)

*Primary Examiner* — Bernard Krasnic
(74) *Attorney, Agent, or Firm* — Christopher Ignatius Moylan

(57) ABSTRACT

A method of calibrating an eye-tracking system for use with a camera, wherein in use the eye-tracking system obtains a plurality of images of a user's eye from the camera, uses a normalisation process to convert the images to a normalised image space based on at least one intrinsic property of the camera, and uses a gaze determination process to determine an estimate of the gaze of the user's eye based on the normalised images.

16 Claims, 5 Drawing Sheets

(56) References Cited

OTHER PUBLICATIONS

Gudi, A.—"Efficiency in Real-time Webcam Gaze Tracking"—arXiv 2020—pp. 1-15 (Year: 2020).*

Swedish search report for Patent Application No. 2230401-8, completed on 2023-08-15.

Chaudhary AK, Nair N, Bailey RJ, Pelz JB, Talathi SS, Diaz GJ. Temporal RIT-Eyes: From Real Infrared Eye-Images to Synthetic Sequences of Gaze Behavior. IEEE Trans Vis Comput Graph. Aug. 3, 20221;PP. doi: 10.1109/ TVCG.2022.3203100. Epub ahead of print.

Naqvi, Rizwan & Arsalan, Muhammad & Park, Kang. (2017). Fuzzy System-Based Target Selection for a NIR Camera- Based Gaze Tracker. Sensors (Basel, Switzerland). 17. 10.3390/ s17040862.

K. R. Moser, M. S. Arefin and J. E. Swan, "Impact of Alignment Point Distance and Posture on SPAAM Calibration of Optical See-Through Head-Mounted Displays," 2018 IEEE International Symposium on Mixed and Augmented Reality (ISMAR), Munich, Germany, 2018, pp. 21-30, doi: 10.1109/ISMAR.2018.00025.

European search report for Patent Application No. EP 23 21 0421, completed on Mar. 18, 2024.

Grubert, Jens, et al. "A survey of calibration methods for optical see-through head-mounted displays." IEEE transactions on visualization and computer graphics 24.9 (2017): 2649-2662.

* cited by examiner

EYE TRACKING SYSTEM AND A CORRESPONDING METHOD

CROSS-REFERENCE TO RELATED APPLICATION

The present application claims priority to Swedish patent application No. 2230401-8, filed Dec. 8, 2022, entitled "An Eye Tracking System and a Corresponding Method," and is hereby incorporated by reference in its entirety.

TECHNICAL FIELD

The present disclosure relates to eye-tracking systems, methods that may include gaze detection systems and methods that may use deep learning systems, such as neural networks to detect gaze from one or more images of a user's eye.

BACKGROUND

Interaction with computing devices is a fundamental action in today's world. Computing devices, such as personal computers, tablets, and smart phones are found throughout daily life. In addition, computing devices that are wearable, such as wearable headset devices (e.g., virtual reality headsets and augmented reality headsets), are becoming more popular. The systems and methods for interacting with such devices define how they are used and what they are used for.

Advancements in eye-tracking technology have made it possible to interact with a computing device using a person's gaze information, in other words, the location on a display that the user is looking at. This information can be used for interaction solely, or in combination with a contact-based interaction-based technique (e.g., using a user input device, such as a keyboard, a mouse, a touch screen, or another input/output interface).

A previously proposed system and method for determining gaze information from images of a user's eye using deep learning systems can be found in EP 3 547 216, which is herein incorporated by reference.

In general, previously known systems and methods for determining a user's gaze using deep learning systems are either configured for use with a specific camera to obtain the images of a user's eye or are based upon detailed knowledge of the properties of the camera being used to obtain the images of a user's eye.

It would be desirable, however, to be able to perform gaze tracking without being limited to a specific camera or requiring detailed knowledge of the configuration of the camera such that gaze tracking can be performed with a wider range of cameras even without detailed knowledge of their configuration.

According to the present disclosure there is provided a method of calibrating an eye-tracking system for use with a camera, wherein in use the eye-tracking system obtains a plurality of images of a user's eye from the camera, uses a normalisation process to convert the images to a normalised image space based on at least one intrinsic property of the camera, and uses a gaze determination process to determine an estimate of the gaze of the user's eye based on the normalised images, the method of calibrating the eye-tracking system comprising: obtaining a calibration image of a user's eye from the camera while the user is instructed to look at a calibration point; obtaining potential values for at least one intrinsic property of the camera; converting the calibration image using the normalisation process based on the potential values for the at least one intrinsic property of the camera to generate corresponding normalised calibration images; processing the normalised calibration images using the gaze detection process; and determining which of the normalised calibration images best estimates the gaze of a user's eye relative to the expected gaze when the user looks at the calibration point; and setting the normalisation process for subsequent use of the eye-tracking system to use the value for the at least one intrinsic property of the camera that was used to generate the normalised calibration image that best estimated the expected gaze when the user looks at the calibration point.

In an arrangement, the at least one intrinsic property of the camera for which potential values are used to generate corresponding normalised calibration images includes at least one of the field of view of the camera, the focal length of the camera and the principle point of the camera.

In an arrangement, the potential values used to generate the normalised calibration images includes values of the diagonal field of view of the camera.

In an arrangement, the potential values of the diagonal field of view of the camera are in a range of from 40° to 100°, optionally in a range of from 50° to 90°, optionally in a range from 60° to 80°.

In an arrangement, the potential values of the diagonal field of view of the camera span a range and are provided at intervals of one of 10°, 5°, 3°, or 1°.

In an arrangement, plural calibration images of a user's eye are obtained from the camera, each associated with a different calibration point at which the user is instructed to look while the calibration image is obtained; each calibration image is converted to normalised calibration images based on the potential values for the at least one intrinsic property of the camera to provide sets of normalised calibration images, each set including a normalised calibration image corresponding to each calibration point at which the user is instructed to look and each normalised calibration image in the set is generated with the same potential value for the at least one intrinsic property of the camera; and the method comprises: processing the sets of normalised calibration images using the gaze determination process and determining which of the sets of normalised calibration images best estimates the gaze of a user's eye relative to the expected gaze when the user looks at the calibration points; and setting the normalisation process for subsequent use of the eye-tracking system to use the value for the at least one intrinsic property of the camera associated with the set of normalised calibration images that best estimated the expected gaze when the user looked at the calibration points.

In an arrangement, determining which set of normalised calibration images best estimates the gaze of a user's eye relative to the expected gaze when the user looks at the calibration points comprises determining, for each set of normalised calibration images, an average difference between the estimated gaze and the expected gaze for each of the calibration points.

In an arrangement, plural calibration images of a user's eye are obtained from the camera while the user is instructed to look at the or each calibration point; and each calibration image corresponding to a calibration point is converted, using each of the potential values for the at least one intrinsic property of the camera, into respective normalised calibration images that are used to determine which value of the at least one intrinsic property of the camera is to be used for the normalisation process for subsequent use of the eye-tracking system.

In an arrangement, the normalisation process used in the eye-tracking system additionally uses at least one intrinsic property of the camera not determined using the normalised calibration images.

In an arrangement, the method of calibrating the eye-tracking system comprises obtaining data from the camera identifying at least one intrinsic property of the camera.

In an arrangement, the method of calibrating the eye-tracking system comprises determining a value for at least one intrinsic property of the camera from image data provided by the camera.

In an arrangement, the potential values for the at least one intrinsic property of the camera are predetermined, and the method comprises obtaining the potential values from a memory associated with the eye-tracking system.

In an arrangement, the eye-tracking system is configured for use with a display; and the method of calibrating the eye-tracking system comprises providing an image on the display to provide the calibration point for the user to look at while a calibration image is obtained.

In an arrangement, the method comprises obtaining data from the user corresponding to at least one of the location of the camera relative to the display and the orientation of the camera relative to the display.

In an arrangement, the method comprises instructing the user to align the camera with the plane of the display.

In an arrangement, the method comprises obtaining data corresponding to the position of the camera relative to the display by tracking the movement by the user of an icon provided on the display to a position that is closest to the camera.

In an arrangement, the relative positions of the camera and the display are fixed.

According to the present disclosure there is provided a method of tracking the gaze of a user using an eye-tracking system, comprising calibrating the eye-tracking system using the any of the arrangements discussed above.

According to the present disclosure there is provided an eye-tracking system for use with a camera, wherein the eye-tracking system is configured to obtain a plurality of images of a user's eye from the camera, use a normalisation process to convert the images to a normalised image space based on at least one intrinsic property of the camera, and use a gaze determination process to determine an estimate of the gaze of the user's eye based on the normalised images; and the eye-tracking system is further configured to: obtain a calibration image of a user's eye from the camera while the user is instructed to look at a calibration point; obtain potential values for at least one intrinsic property of the camera; convert the calibration image using the normalisation process based on the potential values for the at least one intrinsic property of the camera to generate corresponding normalised calibration images; process the normalised calibration images using the gaze detection process; determine which of the normalised calibration images best estimates the gaze of a user's eye relative to the expected gaze when the user looks at the calibration point; and set the normalisation process for subsequent use of the eye-tracking system to use the value for the at least one intrinsic property of the camera that was used to generate the normalised calibration image that best estimated the expected gaze when the user looks at the calibration point.

In an arrangement, the at least one intrinsic property of the camera for which potential values are used to generate corresponding normalised calibration images includes at least one of the field of view of the camera, the focal length of the camera and the principle point of the camera.

In an arrangement, the potential values used to generate the normalised calibration images includes values of the diagonal field of view of the camera.

In an arrangement, the potential values of the diagonal field of view of the camera are in a range of from 40° to 100°, optionally in a range of from 50° to 90°, optionally in a range from 60° to 80°.

In an arrangement, the potential values of the diagonal field of view of the camera span a range and are provided at intervals of one of 10°, 5°, 3°, or 1°.

In an arrangement, the eye-tracking system is configured such that plural calibration images of a user's eye are obtained from the camera, each associated with a different calibration point at which the user is instructed to look while the calibration image is obtained; each calibration image is converted to normalised calibration images based on the potential values for the at least one intrinsic property of the camera to provide sets of normalised calibration images, each set including a normalised calibration image corresponding to each calibration point at which the user is instructed to look and each normalised calibration image in the set is generated with the same potential value for the at least one intrinsic property of the camera; and the eye-tracking system is further configured to process the sets of normalised calibration images using the gaze determination process and determine which of the sets of normalised calibration images best estimates the gaze of a user's eye relative to the expected gaze when the user looks at the calibration points; and set the normalisation process for subsequent use of the eye-tracking system to use the value for the at least one intrinsic property of the camera associated with the set of normalised calibration images that best estimated the expected gaze when the user looked at the calibration points.

In an arrangement, determining which set of normalised calibration images best estimates the gaze of a user's eye relative to the expected gaze when the user looks at the calibration points comprises determining, for each set of normalised calibration images, an average difference between the estimated gaze and the expected gaze for each of the calibration points.

In an arrangement, plural calibration images of a user's eye are obtained from the camera while the user is instructed to look at the or each calibration point; and each calibration image corresponding to a calibration point is converted, using each of the potential values for the at least one intrinsic property of the camera, into respective normalised calibration images that are used to determine which value of the at least one intrinsic property of the camera is to be used for the normalisation process for subsequent use of the eye-tracking system.

In an arrangement, the normalisation process used in the eye-tracking system additionally uses at least one intrinsic property of the camera not determined using the normalised calibration images.

In an arrangement, the eye-tracking system is configured to obtain data from the camera identifying at least one intrinsic property of the camera.

In an arrangement, the eye-tracking system is configured to determine a value for at least one intrinsic property of the camera from image data provided by the camera.

In an arrangement, the potential values for the at least one intrinsic property of the camera are predetermined, and the eye-tracking system is configured to obtain the potential values from a memory associated with the eye-tracking system.

In an arrangement, the eye-tracking system is configured for use with a display; and the eye-tracking system is configured to provide an image on the display to provide the calibration point for the user to look at while a calibration image is obtained.

In an arrangement, the eye-tracking system is configured to obtain data from the user corresponding to at least one of the location of the camera relative to the display and the orientation of the camera relative to the display.

In an arrangement, the eye-tracking system is configured to instruct the user to align the camera with the plane of the display.

In an arrangement, the eye-tracking system is configured to obtain data corresponding to the position of the camera relative to the display by tracking the movement by the user of an icon provided on the display to a position that is closest to the camera.

In an arrangement, the relative positions of the camera and the display are fixed.

According to the present disclosure there is provided a computer program product comprising instructions which, when executed on a processor, causes the processor to perform the method of any one of arrangements discussed above.

According to the present disclosure there is provided the computer program product discussed above, comprising a non-transitory computer-readable medium storing the instructions.

LIST OF FIGURES

FIG. 1 schematically depicts an eye-tracking system.

DETAILED DESCRIPTION

Figure 1:
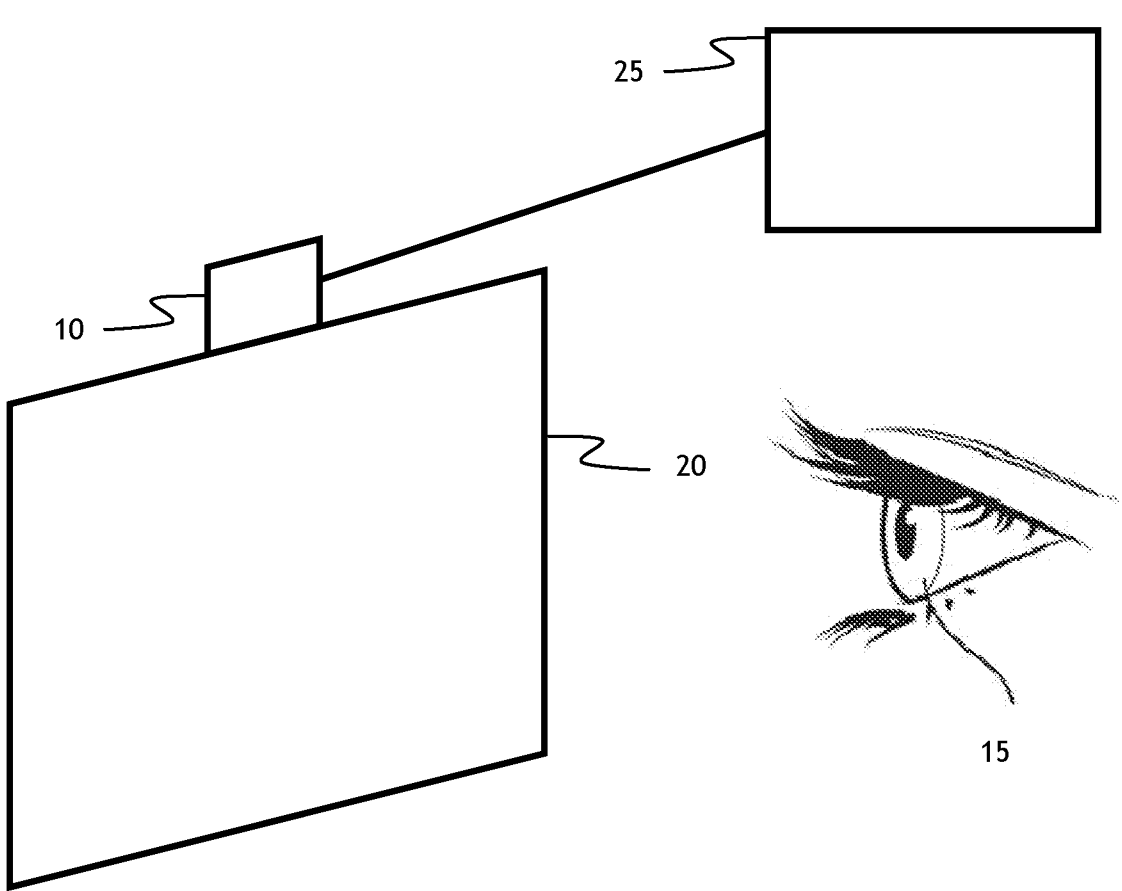

FIG. 1 schematically depicts an example of an eye-tracking system of the present disclosure. As shown, a camera 10 is provided to obtain images of a user's eye 15. The camera 10 may be provided such that it can capture images of the user's eye 15 when the user is looking at a display 20, for example with a view to determining at which point on the display 20 the user is looking. The camera 10 is connected to a processing system 25 that is configured to process images from the camera 10 in order to provide a determination of the gaze of the user.

It should be appreciated that the camera 10 may be connected to the processing system 25 by any appropriate means in order to provide data, including image data, from the camera 10 to the processing system 25. For example, the camera 10 may be connected to the processing system 25 by a wired connection or a wireless connection using any suitable protocol.

It should also be appreciated that the processing system 25 need not be provided within a single unit of computer hardware, as schematically depicted in FIG. 1, but may be distributed, such that some processing is performed locally within the eye-tracking system hardware, or on a computing device configured to perform eye-tracking, and some processing is performed remotely. For example, some processing tasks that are computationally intensive, such as those based on deep learning systems, may be performed remotely, such as by cloud-hosted services.

Figure 2:
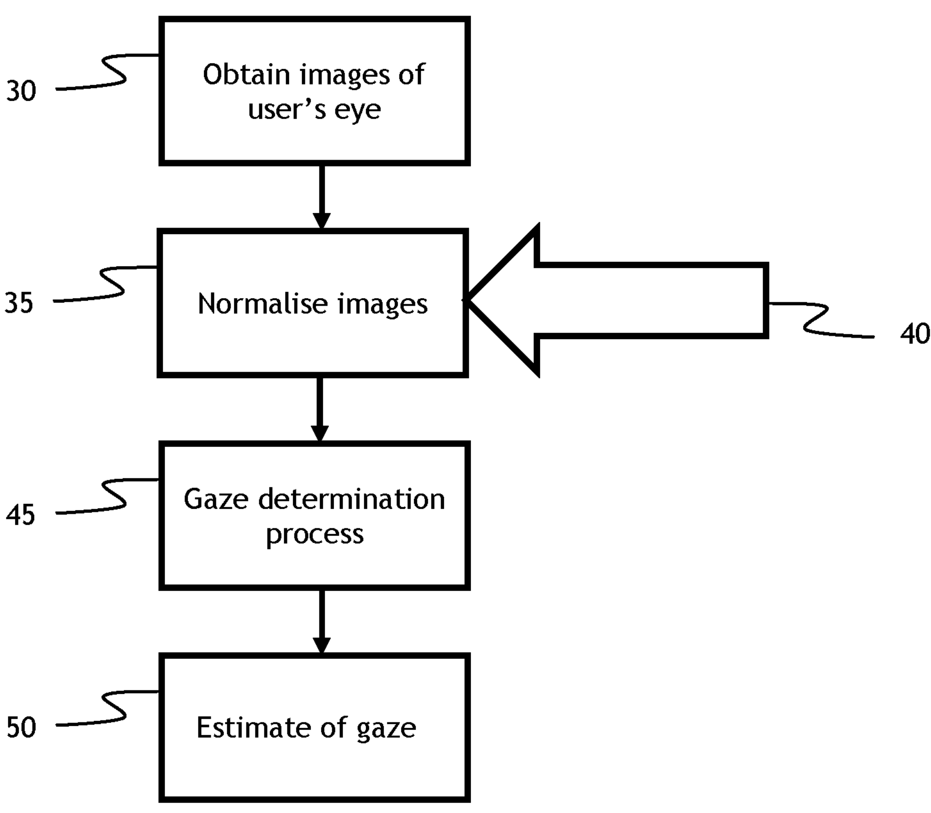
FIG. 2 depicts a method of operating an eye-tracking system.

FIG. 2 summarises the method performed by an eye-tracking system such as that depicted in FIG. 1. In a first step 30, one or more images of the user's eye 15 are obtained. The one or more images are then processed using a normalisation process 35 to convert the images to a normalised image space based on at least one intrinsic property 40 of the camera 10. The normalised images are subject to a gaze determination process 45 in order to determine an estimate of the gaze 50 of the user's eye 15. As discussed above, the gaze determination process may be based on a deep learning system, for example using a neural network. The deep learning system is trained before use of the eye-tracking system using a plurality of images of users' eyes. Using normalised images, the deep learning system can perform gaze determination based on images captured by a camera 10 having different values for intrinsic properties of the camera, such as the image resolution, focal length, or field of view, from the camera that was used to capture the training images used in order to train the deep learning system. Accordingly, the deep learning system does not need to be trained separately for each different camera.

In an arrangement, as discussed in detail in EP 3 547 216 A1, a camera captures a two-dimensional (2D) image of a user gazing at a point in 3D space. A rough distance between the camera and the user's eyes is estimated from this 2D image. The 2D image is normalized to generate warped images centered around the user's eye at a high resolution and a warped image around the user's face is generated at a low resolution. These warped images are input to the neural network that, in turn, predicts a 2D gaze vector per eye and a distance correction for the rough distance. A position of the eye in 3D space is estimated based on rough distance and the distance correction, and a position of the camera in the 3D space. Based on a mapping function between the 2D space and the 3D space, each 2D gaze vector is mapped to a 3D gaze direction. The 3D position of an eye and its 3D gaze direction indicate the 3D gaze associated with that eye.

Because a normalized 2D image is used and because the neural network predicts a distance correction and 2D gaze vectors, the neural network's predictions do not depend on the camera and screen configuration. Hence, that same trained neural network can be used across different eye tracking systems including ones integrated with different types of smartphones, tablets, laptops, wearable headset devices (e.g., virtual reality and augmented reality headsets), and standalone eye tracking systems. Further, because 3D gaze is detected, stereoscopic displays and 3D applications can be supported.

The training of the neural network generally relies on training images that are diverse with respect to the locations of gaze points relative to 2D planes of cameras used to capture the training images (e.g., for each camera, an X, Y plane perpendicular to the camera's line-of-sight). In particular, some of the training images show user eyes that gazed at gaze points located in the 2D planes of the cameras, while other training images show user eyes that gazed at gaze points outside of the 2D planes. During the training, the neural network looks for gaze angles between user eyes-cameras and user uses-gaze points and eye-to-camera distances. Because diversity is used, the neural network can correctly find the angles and the distances. Gaze lines (also referred to as gaze rays) are predicted from the gaze angles and distances between the gaze points and the gaze lines (gaze point-to-gaze line distances) are computed. The loss function of the neural network involves gaze point-to-gaze line distances. During the training, the parameters of the neural network (e.g., weights of connection between nodes at the different layers) are updated to minimize the loss function by minimizing the difference between the true and predicted gaze point-to-gaze line distances. In the interest of brevity, from herein forward, an image refers to a 2D image, unless otherwise indicated.

The intrinsic properties of the camera 10 that may be used in the normalisation process 35 to convert images captured by the camera 10 to the normalised image space may include at least one of the field of view of the camera, the focal length of the camera, the principle point of the camera and the resolution of the camera. Accordingly, in order to perform the normalisation process 35, it is necessary to provide to the processing system 25 values for each of the intrinsic properties 40 of the camera 10 required for the normalisation process 35.

In some arrangements, at least one of the intrinsic properties 40 of the camera 10 may be obtained in advance of operating the eye-tracking system. For example, the processing system 25 may be able to obtain values for one or more intrinsic properties 40 of the camera 10 directly from the camera 10.

Alternatively or additionally, the processing system 25 may be able to obtain a model identification number for the camera 10, either form the camera 10 itself, or through input from a user via a user interface, and look up the value of the intrinsic property of the camera 10 for that model in a look up table that may be held within the processing system or may be accessible to it via a network, such as the internet.

Alternatively, or additionally, the eye-tracking system may prompt a user to input a value of an intrinsic property 40 of the camera 10 via a user interface.

Alternatively, or additionally, the processing system 25 may be able to determine a value for at least one intrinsic property 40 of the camera 10 from the image data itself provided by the camera 10. For example, the processing system 25 may be able to determine the image resolution of the camera 10 from the image data provided by the camera 10.

However, in some situations it may not be possible, or desirable, to obtain at least one intrinsic property 40 of the camera 10 in advance of operating the eye-tracking system. Accordingly, the present disclosure provides a method of calibrating an eye-tracking system for use with a camera 10 in order to provide a value for at least one intrinsic property 40 of the camera 10 for use in the normalisation process 35 used to generate normalised images for use in the gaze determination process 45. In determining a value for the at least one intrinsic property of the camera 10 to be used in the subsequent operation of the eye-tracking system, a value may be selected that results in most accurate gaze estimation in subsequent use, regardless of whether or not the value most accurately estimates the value for the intrinsic property of the camera 10.

It should be understood that the calibration method may be used in advance of operating the eye-tracking system and/or periodically during operation of the eye-tracking system.

Figure 3:
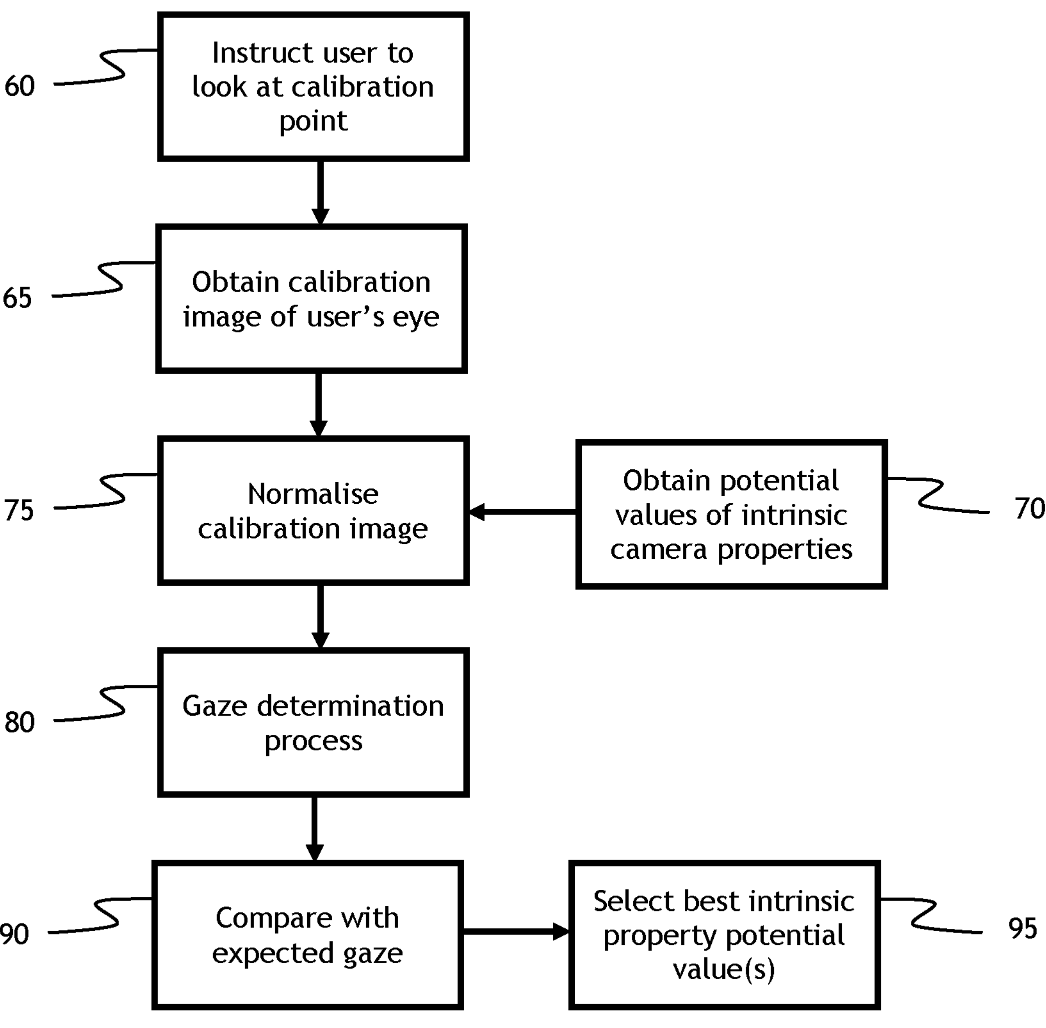
FIG. 3 depicts a method of calibrating an eye-tracking system.

FIG. 3 depicts the steps of the method of calibrating an eye-tracking system according to the present disclosure. In a first step 60, the user is instructed to look at a calibration point that is selected such that the eye-tracking system has data corresponding to the expected gaze of a user when looking at the calibration point.

In a next step 65, a calibration image of the user's eye 15 is obtained from the camera 10 while the user is looking at the calibration point. Meanwhile, in a separate step 70 plural potential values are obtained for at least one intrinsic property 40 of the camera 10.

The plural potential values for the at least one intrinsic property 40 of the camera 10 may be a predetermined range of potential values, for example based on a known range of possible values for cameras 10 that may be used with the eye-tracking system or may be determined based on information that the eye-tracking system has obtained about the camera 10 being used. Any data relating to the potential values of the at least one intrinsic property 40 of the camera 10 may be stored in, and obtained from, a memory associated with the eye-tracking system. Such a memory may be part of the eye-tracking system, for example included within the processing system 25 of the eye-tracking system or may be separate from the eye-tracking system but accessible by it.

In a next step 75 of the calibration method, the normalisation process 35 of the eye-tracking system is used to convert the calibration image obtained from the camera 10 into respective normalised calibration images using each of the potential values for the at least one intrinsic property 40 of the camera 10. Where plural potential values are obtained for only one intrinsic property 40 of the camera 10, a normalised calibration image may be generated from the calibration image for each one of the potential values of the one intrinsic property of the camera 10. Where plural intrinsic properties 40 of the camera 10 are unknown and potential values for each are obtained, normalised calibration images may be generated for each combination of potential values of the intrinsic properties 40 of the camera 10.

In a subsequent step 80, each of the normalised calibration images is processed using the gaze detection process 45 of the eye-tracking system in order to provide a respective gaze estimate for each of the calibration images. Then, in a comparison step 90, each of the gaze estimates generated by the gaze detection process 45 is compared to the expected gaze when the user is looking at the calibration point in order to determine which of the normalised calibration images best estimates the gaze of a user's eye 15 when looking at the calibration point. For example, the expected gaze may be compared with each of the gaze estimates generated by the gaze estimates generated by the gaze detection process 45 to determine which is closest to the expected gaze when the user is looking at the calibration point. Accordingly, the best estimate may be the gaze estimate that is closest to the expected gaze when the user is looking at the calibration point.

In a subsequent step 95, the value for the at least one intrinsic property of the camera 10 that was used to generate the normalised calibration image that best estimated the expected gaze when the user looked at the calibration point is set to be subsequently used as the value for the at least one intrinsic property 40 of the camera 10 in the normalisation process 35 in subsequent use of the eye-tracking system. This may enable the eye-tracking system to be based on a deep learning algorithm notwithstanding the fact that the deep learning algorithm may have been trained using images captured from one or more cameras that have different values for intrinsic properties of the camera, such as image resolution, focal length and field of view, from those of the camera being used with the eye-tracking system and notwithstanding the fact that the value of at least one of those intrinsic properties of the camera being used with the eye-tracking system is unknown.

It should be appreciated that the calibration method described above may in effect estimate the value of the at least one intrinsic property 40 of the camera. However, this need not be the case. For example, another of the potential values for an intrinsic property of the camera 10 may be a more accurate estimate of the actual intrinsic property of the camera. However, the above method determines which value of the intrinsic property of the camera should be used in the image normalisation process 35 ultimately to provide the best gaze estimate for the user's eye when operating the eye-tracking system.

In an arrangement, the at least one intrinsic property 40 of the camera for which plural potential values are obtained and tested by generation of corresponding calibration images may include at least one of the fields of view of the camera, the focal length of the camera and the principal point of the camera. In an arrangement, the potential values used to generate the normalised calibration images may include values of the diagonal field of view of the camera.

In an arrangement in which the value of the diagonal field of view of the camera 10 is unknown, the potential values may be provided in a range of from 40° to 100°, optionally in a range of from 50° to 90°, optionally in a range of from 60° to 80°. It will be appreciated that providing potential values over a wider range increases the likelihood of the actual value for a camera 10 being used with the eye-tracking system falling within the range. However, the wider the range of values that are tested, either the greater the computational effort, for example if this results in testing a greater number of potential values, or the larger the separation between potential values, for example if a fixed number of potential values across any range are tested, which may reduce the accuracy of the match of the selected value of the intrinsic property of the camera 10 to its true value.

In an arrangement in which potential values of the diagonal field of view of the camera 10 are tested by generating normalised calibration images based on the potential values, the potential values may span a range, such as discussed above, and may be provided at intervals of, for example, 10°, 5°, 3°, or 1°. For example, in an arrangement in which the potential values of the diagonal field of view of the camera are provided in a range of from 50° to 90° in intervals of 5°, the plural potential values provided in step 70 to be used to convert the calibration image into respective normalised calibration images may be 50°, 55°, 65°, 70°, 75°, 80°, 85° and 90°.

Again, it will be appreciated that by setting the intervals to be smaller the greater the likelihood of one of the calibration images providing a gaze estimate that closely matches the expected gaze of the user when looking at the calibration point. However, the smaller the intervals, the greater the number of normalised calibration images that will need to be generated and processed using the gaze detection process 45, namely the greater the computational effort. Accordingly, in setting the plural potential values of the intrinsic properties 40 of the camera 10 to be used in the calibration method, it is necessary to identify a compromise between the computational effort and/or speed of performing the method of calibrating the eye-tracking system and the quality of the calibration process, namely the subsequent accuracy of the gaze determination of the eye-tracking system in operation.

It should also be appreciated that, although in the examples above, even distributions of potential values across a range are used, this need not be the case and other options for selecting the plural potential values for the intrinsic properties 40 of the camera 10 to be used in the calibration method may be appropriate. For example, a set of values for an intrinsic property of the camera 10 may be known to be most common for cameras that may be used with the eye-tracking system. Accordingly, the plural potential values to be used in the calibration method may be set to be the set of most commonly used values for cameras that may be used with the eye-tracking system.

In an arrangement, plural calibration images of a user's eye may be obtained from the camera 10 while the user is instructed to look at the calibration point. Each of the calibration images for the calibration point may be normalised using each of the plural potential values of the intrinsic properties 40 of the camera 10 to generate calibration images. In turn each may be processed using the gaze detection process 45 to generate a gaze estimate. Accordingly for each of the potential values of the at least one intrinsic property 40 of the camera 10, the calibration method may generate plural gaze estimates, one for each of the calibration images obtained while the user is looking at the calibration point.

In such an arrangement, the value of the at least one intrinsic property 40 of the camera 10 selected for subsequent use in operation of the eye-tracking system may be selected by identifying the value that resulted in the smallest average difference between the gaze estimates associated with that value of the at least one intrinsic property 40 of the camera 10 and the expected gaze when the user is looking at the calibration point.

It will be appreciated that the choice of how many calibration images to obtain and process while the user looks at the calibration point is a compromise. The use of a greater number of calibration images may improve the quality of selection of the value of the at least one intrinsic property 40 of the camera 10 to be used in subsequent operation of the eye-tracking system. However, it also increases the computational effort in order to complete the calibration process. In an arrangement, any one of 10 to 15 calibration images may be captured while the user looks at calibration point.

Figure 4:
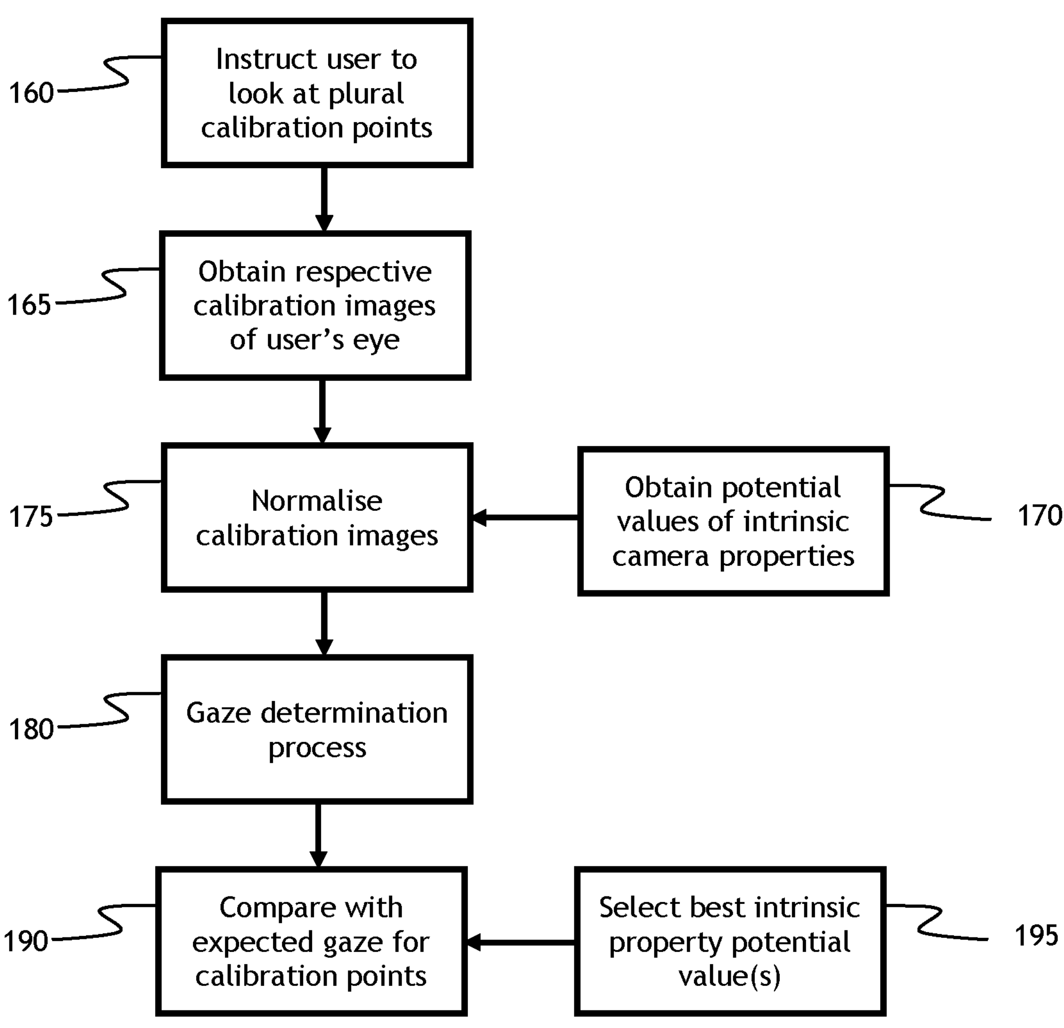
FIG. 4 depicts a method of calibrating an eye-tracking system.

FIG. 4 depicts a variation of the method described above and shown in FIG. 3. In particular, in the method depicted in FIG. 4 the user is instructed in a first step 160 to successively look at multiple different calibration points. While the user is looking at each calibration point a corresponding calibration image is obtained from the camera 10 in step 165 such that each calibration image is associated with a different calibration point. In a similar manner to that discussed above in relation to FIG. 3, plural potential values for the intrinsic properties 40 of the camera 10 to be tested are obtained in step 170 and used in step 175 to generate normalised calibration images. In particular, sets of normalised calibration images are generated that each include a normalised calibration image corresponding to each of the calibration points at which the user was instructed to look. Additionally, in each set of calibration images all of the calibration images are generated with the same potential value(s) for the at least one intrinsic property 40 of the camera 10.

In a subsequent step 180, all of the normalised calibration images are subjected to the gaze determination process 45 of the eye-tracking system to generate sets of gaze estimates that correspond to the sets of normalised calibration images. Subsequently in a determination process 190 it is determined which of the sets of normalised calibration images best estimates the gaze of a user's eye 15 relative to the expected gaze when the user looks at the corresponding calibration points. As with the method discussed above in relation to FIG. 3, in a final step 195, the value(s) for the at least one intrinsic property 40 of the camera 10 associated with the set of normalised calibration images that best estimates the expected gaze when the user looked at the calibration points is set for subsequent use of the normalisation process 35 during operation of the eye-tracking system.

It will be appreciated that determining which set of normalised calibration images best estimates the expected gaze when the user looked at the calibration points may be performed in a number of ways. For example, step 190 may include determining, for each set of normalised calibration images, an average difference between the estimated gaze and the expected gaze for each of the calibration points and selecting the set of normalised calibration images with the smallest average difference.

In a similar manner to that discussed above in relation to FIG. 3, in an arrangement, plural calibration images of a user's eye may be obtained from the camera 10 while the user is instructed to look at each calibration point. Each of the calibration images for each calibration point may be normalised using each of the plural potential values of the intrinsic properties 40 of the camera 10 to generate calibration images. In turn each may be processed using the gaze detection process 45 to generate a gaze estimate. Accordingly, for each of the potential values of the at least one intrinsic property 40 of the camera 10, the calibration method may generate plural gaze estimates, one for each of the calibration images obtained while the user is looking at each of the calibration point.

In such an arrangement, the value of the at least one intrinsic property 40 of the camera 10 selected for subsequent use in operation of the eye-tracking system may be selected by identifying the value that resulted in the smallest average difference between the gaze estimates associated with that value of the at least one intrinsic property 40 of the camera 10 and the expected gaze when the user is looking at each of the calibration points.

It will be appreciated that the choice of how many calibration images to obtain and process for each calibration point is a compromise. The use of a greater number of calibration images for each calibration point may improve the quality of selection of the value of the at least one intrinsic property 40 of the camera 10 to be used in subsequent operation of the eye-tracking system. However, it also increases the computational effort in order to complete the calibration process, especially as this also increases with the number of calibration points used. In an arrangement, any one of 10 to 15 calibration images may be captured for each calibration point used.

The method described above of calibrating the eye-tracking system may be performed by the processing system 25 of the eye-tracking system. Alternatively, or additionally, some or part of the method calibrating the eye-tracking system may be performed in a separate processing system that may be part of, or separate from, the eye-tracking system. For example, the latter may be beneficial if the calibration process would be too slow when performed by the eye-tracking system.

In an arrangement, the one or more calibration points that the user is instructed to look at while a calibration image is obtained may be a fixed point relative to the camera 10. For example, a user may be instructed to measure a set distance from the camera 10 and look at that location.

Figure 5:
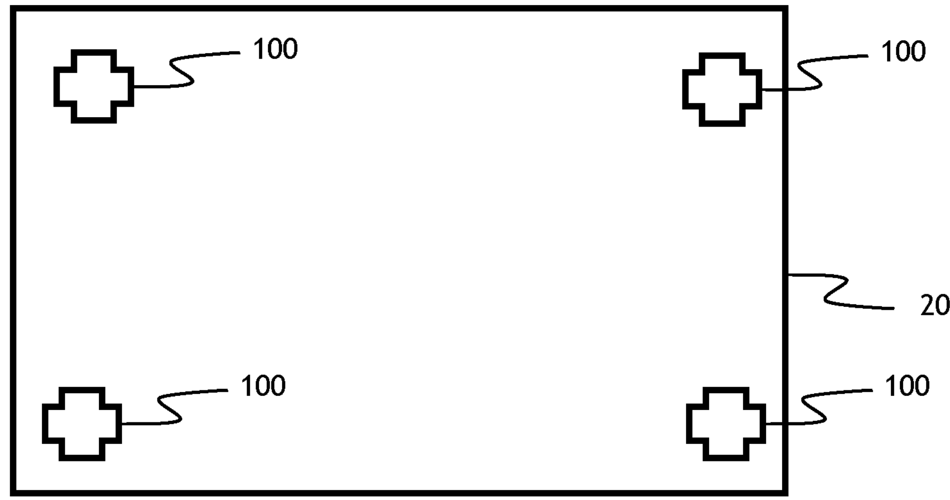
FIG. 5 depicts a display used in a method of calibrating an eye-tracking system.

In an arrangement in which the eye-tracking system is configured for use with a display 20, the method of calibrating the eye-tracking system may include providing an image on the display to provide the calibration point for the user to look at while the calibration image is obtained. For example, as shown in FIG. 5, in an arrangement in which multiple calibration points are used, the display may successively provide images 100 on the display at the desired locations for the user to look at while respective calibration images are obtained. While four images 100 are shown in FIG. 5 to provide four calibration points for the user to look at, it will be appreciated that the method may use a different number of calibration points. For example, the method of calibrating the eye-tracking system may use any one of 5 to 9 calibration points.

In an arrangement in which images are provided on the display 20 to provide the one or more calibration points for the user to look at, the expected gaze of the user may be determined from information regarding the location of the image 100 on the display 20 and the position of the camera 10 relative to the display 20.

In some arrangements, the relative positions of the camera 10 and the display 20 may be fixed, ensuring knowledge of their relative positions.

In arrangements in which the camera 10 is not fixed relative to the display 20, data may be obtained from the user, for example via a user interface, providing at least one of the location of the camera 10 relative to the display 20 and the orientation of the camera 10 relative to the display 20.

Alternatively, or additionally, the user may be instructed to align the camera 10 with the plane of the display 20 and/or to move the camera 10 to a specific location relative to the display 20.

Figure 6:
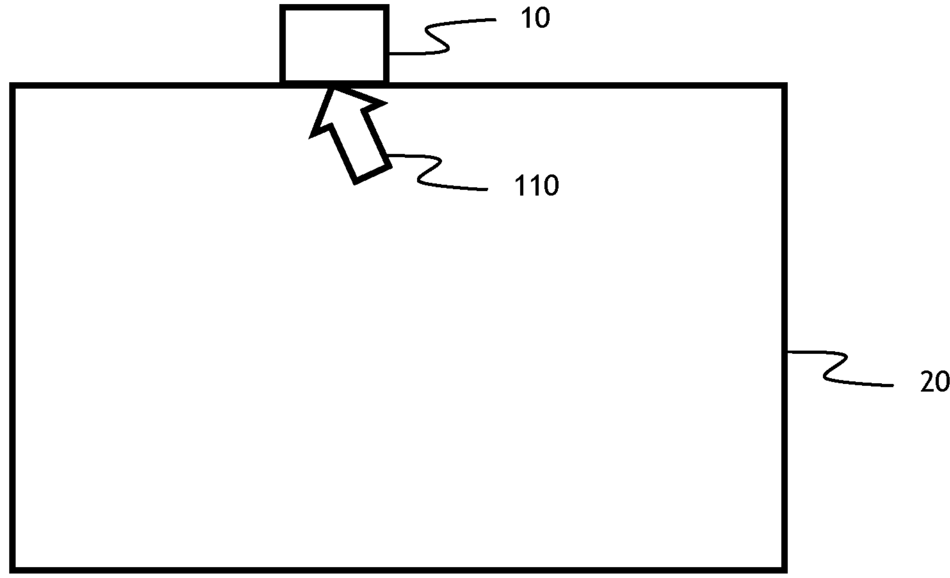
FIG. 6 depicts a display used in a method of calibrating an eye-tracking system.

Alternatively, or additionally, as depicted in FIG. 6, the user may provide data corresponding to the position of the camera 10 relative to the display 20 by moving the image of an icon 110 on the display 20 to a position that is closest to the camera 10. In such an arrangement, knowledge of the position of the image of the icon 110 on the display may provide the required data of the relative positions of the camera 10 and display 20.

It will be appreciated that other arrangements may be provided for obtaining information regarding the relative positions of the camera 10 and display 20. It should also be appreciated that, instead of displaying images at fixed locations on the display 20 to provide the calibration points, moving images may be provided on the display 20 that the user is instructed to follow.

Another aspect of the present invention is directed to a computer program comprising instructions to cause a processor to perform the method shown in any of FIGS. 2 to 4. Another aspect of the present invention is directed to a computer-readable medium having stored there on the computer program.

The invention claimed is:

1. A method of calibrating an eye-tracking system for use with a camera, wherein in use the eye-tracking system obtains a plurality of images of a user's eye from the camera, uses a normalisation process to convert the images to a normalised image space based on at least one intrinsic property of the camera, and uses a gaze determination process to determine an estimate of the gaze of the user's eye based on the normalised images, the method of calibrating the eye-tracking system comprising:

obtaining a calibration image of a user's eye from the camera while the user is instructed to look at a calibration point;

obtaining potential values for at least one intrinsic property of the camera;

converting the calibration image using the normalisation process based on the potential values for the at least one intrinsic property of the camera to generate corresponding normalised calibration images;

processing the normalised calibration images using the gaze determination process; and determining which of the normalised calibration images best estimates the gaze of a user's eye relative to an expected gaze when the user looks at the calibration point; and setting the normalisation process for subsequent use of the eye-tracking system to use the value for the at least one intrinsic property of the camera that was used to generate the normalised calibration image that best estimated the expected gaze when the user looks at the calibration point, wherein plural calibration images of a user's eye are obtained from the camera, each associated with a different calibration point at which the user is instructed to look while the calibration image is obtained;

each calibration image is converted to normalised calibration images based on the potential values for the at least one intrinsic property of the camera to provide sets of normalised calibration images, each set including a normalised calibration image corresponding to each calibration point at which the user is instructed to look and each normalised calibration image in the set is generated with the same potential value for the at least one intrinsic property of the camera;

processing the sets of normalised calibration images using the gaze determination process and determining which of the sets of normalised calibration images best estimates the gaze of a user's eye relative to the expected gaze when the user looks at the calibration points; and setting the normalisation process for subsequent use of the eye-tracking system to use the value for the at least one intrinsic property of the camera associated with the set of normalised calibration images that best estimated the expected gaze when the user looked at the calibration points, and wherein determining which set of normalised calibration images best estimates the gaze of a user's eye relative to the expected gaze when the user looks at the calibration points comprises determining, for each set of normalised calibration images, an average difference between the estimated gaze and the expected gaze for each of the calibration points.

2. The method of claim 1, wherein the at least one intrinsic property of the camera for which potential values are used to generate corresponding normalised calibration images includes at least one of a field of view of the camera, a focal length of the camera and a principle point of the camera.

3. The method of claim 2, wherein the potential values used to generate the normalised calibration images includes values of a diagonal field of view of the camera.

4. The method of claim 3, wherein the potential values of the diagonal field of view of the camera are in a range of from 40° to 100°, in a range of from 50° to 90° or in a range from 60° to 80°.

5. The method of claim 3, wherein the potential values of the diagonal field of view of the camera span a range and are provided at intervals of one of 10°, 5°, 30, or 1°.

6. The method of claim 1, wherein the normalisation process used in the eye-tracking system additionally uses at least one intrinsic property of the camera not determined using the normalised calibration images.

7. The method of claim 6, wherein the method of calibrating the eye-tracking system further comprises obtaining data from the camera identifying at least one intrinsic property of the camera.

8. The method of claim 6, wherein the method of calibrating the eye-tracking system further comprises determining a value for at least one intrinsic property of the camera from image data provided by the camera.

9. The method of claim 1, wherein the potential values for the at least one intrinsic property of the camera are predetermined and the method further comprises obtaining the potential values from a memory associated with the eye-tracking system.

10. The method of claim 1, wherein the eye-tracking system is configured for use with a display; and the method of calibrating the eye-tracking system further comprises providing an image on the display to provide the calibration point for the user to look at while a calibration image is obtained.

11. The method of claim 10, wherein the method comprises obtaining data from the user corresponding to at least one of a location of the camera relative to the display and an orientation of the camera relative to the display.

12. The method of claim 10, wherein the method further comprises instructing the user to align the camera with the plane of the display.

13. The method of claim 10, wherein the method further comprises obtaining data corresponding to a position of the camera relative to the display by tracking movement by the user of an icon provided on the display to a position that is closest to the camera.

14. The method of claim 10, wherein-the relative positions of the camera and the display are fixed.

15. A non-transitory computer-readable medium storing instructions which, when executed on a processor, causes the processor to perform the method of claim 1.

16. An eye-tracking system for use with a camera, wherein the eye-tracking system is configured to obtain a plurality of images of a user's eye from the camera, use a normalisation process to convert the images to a normalised image space based on at least one intrinsic property of the camera, and use a gaze determination process to determine an estimate of the gaze of the user's eye based on the normalised images; and the eye-tracking system is further configured to:

obtain a calibration image of a user's eye from the camera while the user is instructed to look at a calibration point;

obtain potential values for at least one intrinsic property of the camera;

convert the calibration image using the normalisation process based on the potential values for the at least one intrinsic property of the camera to generate corresponding normalised calibration images;

process the normalised calibration images using the gaze determination process;

determine which of the normalised calibration images best estimates the gaze of a user's eye relative to an expected gaze when the user looks at the calibration point; and set the normalisation process for subsequent use of the eye-tracking system to use the value for the at least one intrinsic property of the camera that was used to generate the normalised calibration image that best estimated the expected gaze when the user looks at the calibration point, wherein plural calibration images of a user's eye are obtained from the camera, each associated with a different calibration point at which the user is instructed to look while the calibration image is obtained;

each calibration image is converted to normalised calibration images based on the potential values for the at least one intrinsic property of the camera to provide sets of normalised calibration images, each set including a normalised calibration image corresponding to each calibration point at which the user is instructed to look and each normalised calibration image in the set is generated with the same potential value for the at least one intrinsic property of the camera;

process the sets of normalised calibration images using the gaze determination process and determine which of the sets of normalised calibration images best estimates the gaze of a user's eye relative to the expected gaze when the user looks at the calibration points; and set the normalisation process for subsequent use of the eye-tracking system to use the value for the at least one intrinsic property of the camera associated with the set of normalised calibration images that best estimated the expected gaze when the user looked at the calibration points, and wherein determine which set of normalised calibration images best estimates the gaze of a user's eye relative to the expected gaze when the user looks at the calibration points comprises determining, for each set of normalised calibration images, an average difference between the estimated gaze and the expected gaze for each of the calibration points.

* * * * *